United States Patent
Zimmer

(10) Patent No.: US 6,793,396 B2
(45) Date of Patent: Sep. 21, 2004

(54) WIPER HOUSING AND METHOD FOR PRODUCING A WIPER HOUSING

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 10/169,495

(22) PCT Filed: Aug. 28, 2001

(86) PCT No.: PCT/DE01/03273

§ 371 (c)(1),
(2), (4) Date: Sep. 16, 2002

(87) PCT Pub. No.: WO02/38425

PCT Pub. Date: May 16, 2002

(65) Prior Publication Data

US 2003/0077012 A1 Apr. 24, 2003

(30) Foreign Application Priority Data

Nov. 9, 2000 (DE) .......................................... 100 55 426

(51) Int. Cl.[7] .............................. F16C 23/02; B60S 1/06
(52) U.S. Cl. .................................... 384/247; 15/250.31

(58) Field of Search ......................... 15/250.31, 250.32, 15/250.33, 250.34; 384/247, 252, 295; 296/96.17

(56) References Cited

U.S. PATENT DOCUMENTS 5,142,941 A * 9/1992 Amann et al. ............ 74/606 R
6,421,873 B1   7/2002 Zimmer

FOREIGN PATENT DOCUMENTS

| DE | 198 33 488 A | 1/1999 |
|----|--------------|--------|
| DE | 198 06 855 A | 9/1999 |
| DE | 198 08 441 A | 9/1999 |
| EP | 0 739 792 A | 10/1996 |
| EP | 0 916 559 A | 5/1999 |

* cited by examiner

Primary Examiner—Thomas R. Hannon
(74) Attorney, Agent, or Firm—Michael J. Striker

(57) ABSTRACT

The invention concerns a wiper bearing housing having a bearing region (12) and at least one mounting element (14, 16), whereby at least one transitional region (18, 20) between the bearing region (12) and the mounting element (14, 16) is deformable. The invention further concerns a method for producing a wiper bearing housing (10).

12 Claims, 9 Drawing Sheets

WIPER HOUSING AND METHOD FOR PRODUCING A WIPER HOUSING

The invention concerns a wiper bearing housing having a bearing region and at least one mounting element. The invention further concerns a method for producing a wiper bearing housing having a bearing region and at least one mounting element.

BACKGROUND OF THE INVENTION

Wiper bearing housings—also referred to simply as wiper bearings—are used primarily in the automotive industry. They have the task of supporting a wiper shaft or the bearing rotating link in rotatable fashion. In general, the wiper bearing housing is outfitted with at least one mounting element. Said mounting element can be realized as a fixing eye, for example, that is fastened to the body of a motor vehicle. Furthermore, tubular regions are arranged on certain types of wiper housings. These tubular regions are pushed onto holding bars of a wiper system.

It is known to design wiper bearing housings out of aluminum or zinc die casting, or plastic injection molding, or as a sheet-metal component to be bent, for instance.

The geometry of the wiper bearing furthermore determines the orientation of the wiper axis in relation to the body and, in particular, in relation to the motor-vehicle window to be cleaned. The wiper axis position is vehicle-specific, i.e., it depends on the geometry of the windshield. Additionally, the wiper bearing geometry must be adjusted individually for the vehicle type with regard for the fastening to the body. For this reason, the wiper bearings must be newly adjusted for nearly every vehicle type, so that high tool costs are incurred for production of the wiper bearing housings.

Sheet-metal bearing housings have the advantage that they are cost-effective, in particular in the case of large numbers of units. The costs are dependent on the number of units, because a complex and expensive tool having, e.g., 15 to 20 tool stages, must be used.

A further set of problems regarding wiper bearing housings concerns vehicle safety. Wiper bearing housings that are designed rigid in nature pose a safety risk, e.g., if a pedestrian is thrown onto a moving vehicle. It is already known to provide wiper bearing housings with a set fracture point or to also arrange a selected tube on the wiper bearing housing that can deform upon impact. These additional measures involved in the design of wiper bearing housings also lead to undesired additional costs.

SUMMARY OF THE INVENTION

The invention is based on the generic wiper bearing housing in that at least one transitional region between the bearing region and the mounting element is deformable. Due to the deformability of the transitional region between the bearing region and the mounting element, the angle of the wiper axis can be selected in variable fashion in relation to the vehicle body. It is therefore possible to use the same basic type for different vehicles, which markedly reduces the tool costs for creating vehicle-specific wiper bearings. Costs can also be reduced by increasing the number of units, which is then made possible.

A fixing eye is preferably provided as mounting element. Using such a fixing eye, the wiper bearing housing can be fastened to the vehicle body. Due to the deformability of the transitional region between the bearing region and the fixing eye, the wiper axis angle can be adjusted.

It is preferrable for a tubular region to be provided as the mounting element. With a tubular region of this type, the wiper bearing housing is generally pushed onto a holding bar of a wiper system. The wiper housing is rotatable on the tubular region. As a result of a deformable region that can be situated between the bearing region and the tubular region, additional degrees of freedom are available for the orientation of the wiper axis.

The deformability of the at least one transitional region is realized preferably by means of a corrugated region. In general, such a corrugated region is simple to produce, and it can be designed so that sufficient deformability is available.

It is advantageous in particular when the wiper bearing housing is designed as a sheet-metal component to be bent. This is a cost-effective variant of wiper bearing housings. In the case of large numbers of units, in particular, the invention can reveal its advantageous, cost-saving effects in this fashion.

It is furthermore advantageous when the wiper bearing is deformable or strainable under the influence of increased axial force. In this fashion it can be achieved that the bearing region can shift position when an axial force is applied. In this fashion, the forces acting on persons in the case of impact can be reduced.

It can be advantageous if a deformability or strainability is plastic. A deformation of the wiper bearing housing can therefore be irreversibly shaped, so that, after an impact, one is required, for safety considerations, to replace the wiper bearing housing, which was seriously damaged by the impact.

It can also be advantageous, however, when a deformability or strainability is elastic. In this case, in particular after a light impact, the wiper bearing housing returns to its original position, so that a functional wiper system exists without the need for further repair.

The invention is based on the generic method in that at least one deformable transitional region is situated between the bearing region and the mounting element. The angle of the wiper axis in relation to the vehicle body can be selected in variable fashion by means of the deformability of the transitional region between the bearing region and the mounting element. It is possible, therefore, to use the same basic type for different motor vehicles, which markedly reduces the tool costs for producing vehicle-specific wiper bearings. Costs can also be reduced by increasing the number of units, which is then made possible.

The forming of the deformable transitional region preferably takes place in a forming tool. Accordingly, the production process can take place in such a fashion that the forming tool stages are integrated in the tool, e.g., as tool inserts. In the first tool stages, therefore, the universal shape of the wiper bearing housing is first produced with the deformable regions. In the final tool stages, the forming desired for the specific application is then carried out.

It can also be practical when the forming of the deformable transitional region takes place outside of a tool. The forming can therefore take place independently of the actual production process.

It is preferable that a tubular region is provided as the mounting element, and that the tubular region is pushed onto a holding tube before the transitional region is formed, whereby the tubular region can rotate in an axial direction. It is possible, therefore, to wait until assembly to bring a wiper bearing housing comprising a universal shape into its final form, whereby the additional degree of freedom of rotation on a holding tube is utilized.

A corrugated transitional region is preferably moulded. Generally speaking, such a corrugated region is simple to produce, and it can be designed so that a sufficient deformability is available.

It is furthermore advantageous when a sheet-metal component is used as the starting workpiece. This is a cost-effective variant of wiper bearing housings. When large numbers of units are involved, in particular, the invention can reveal its advantageous, cost-saving effects in this fashion.

The invention is based on the surprising finding that, on account of the deformability of transitional regions, a universally-usable wiper bearing housing can be produced. The required wiper axis position can be realized in the wiper bearing with comparably low expense by means of the deformation regions, in particular by adapting the orientation of the connecting pin in relation to the sheet-bar tube and/or the orientation of the fixing eye, and on account of the free orientation of the wiper bearing by means of rotation in relation to the sheet-bar tube. The cost reductions are based, on the one hand, on the fact that individual tools for every new vehicle model need not be made available, whereby the increase in the number of units of the produced wiper bearing housing plays an important role here in particular.

BRIEF DESCRIPTION OF THE DRAWINGS

The invention will now be explained with reference to the accompanying drawings based on preferred exemplary embodiments.

DETAILED DESCRIPTION OF THE PREFERRED EMBODIMENTS

Figure 1:
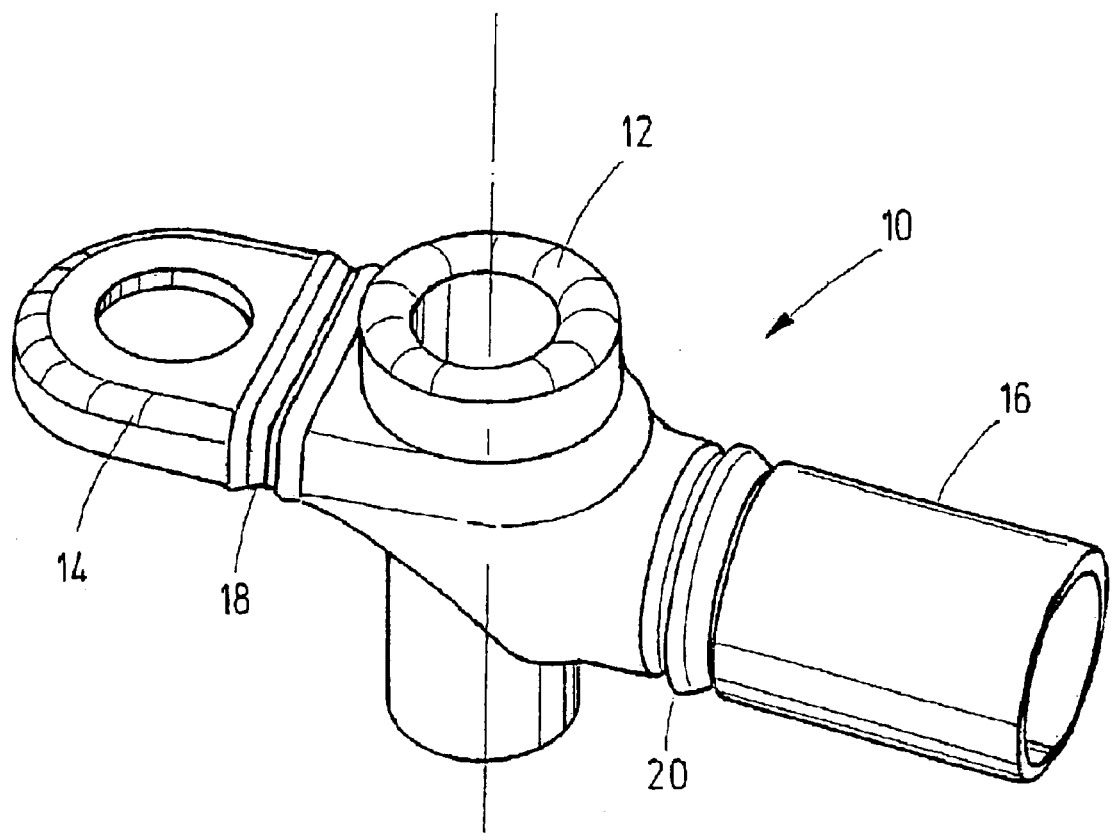
FIG. 1 shows a perspective view of a wiper bearing housing according to the invention.

In the following description of the preferred exemplary embodiments, identical reference numerals refer to identical or similar elements.

A perspective view of a wiper bearing housing 10 according to the invention is shown in FIG. 1. The wiper bearing housing 10 has a cylindrically-shaped bearing region 12. The wiper shaft or the bearing rotating link is supported in rotatable fashion in this bearing region 12. The wiper bearing housing 10 further comprises two mounting elements, one of which is developed as a fixing eye 14, and the other as a tubular region 16. In general, the wiper bearing housing 10 is fastened to a motor vehicle body with the fixing eye 14. In general, the tubular region 16 is pushed onto a holding bar of a wiper system, and after orientation of the wiper bearing housing, the tubular region 16 can be welded to the holding bar. In the exemplary embodiment according to FIG. 1, both the fixing eye 14 and the tubular region 16 are interconnected with the bearing region 12 by means of deformable regions 18, 20. The deformable regions are realized by means of a corrugation.

Figure 2:
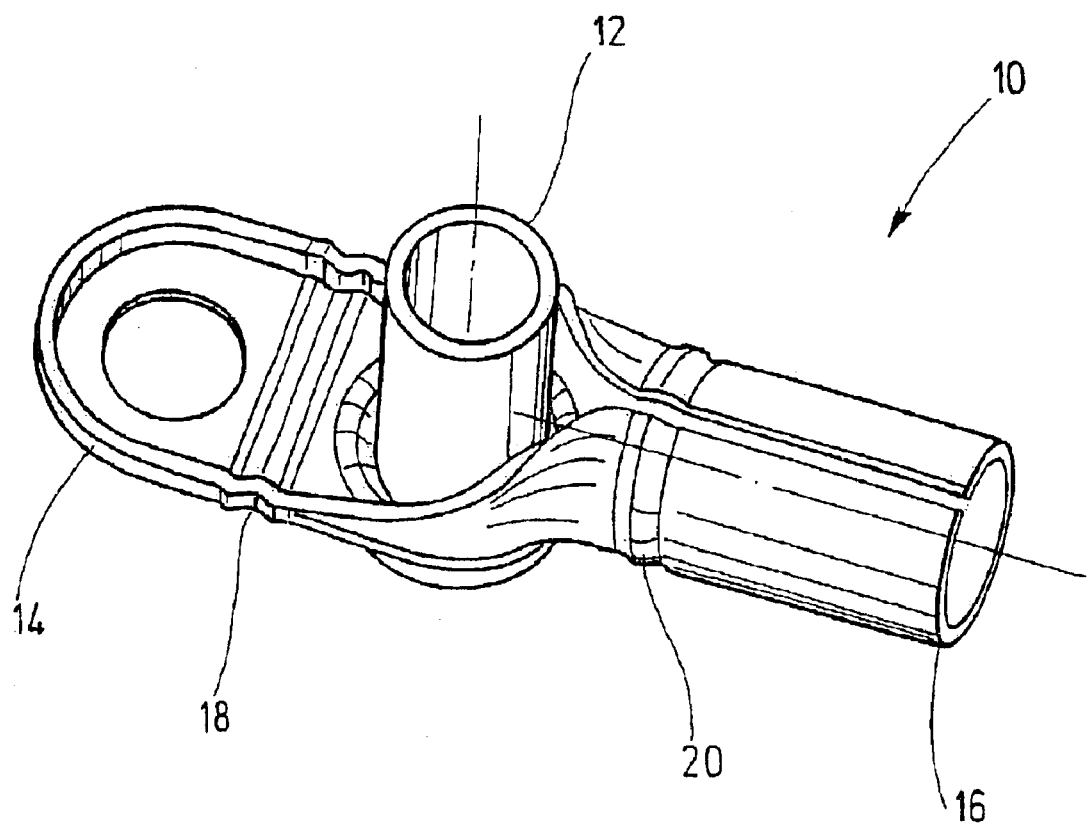
FIG. 2 shows a further perspective view of a wiper bearing housing according to the invention.

FIG. 2 shows a second perspective view of the wiper bearing housing 10 that is shown in an initial perspective view in FIG. 1.

Figure 3:
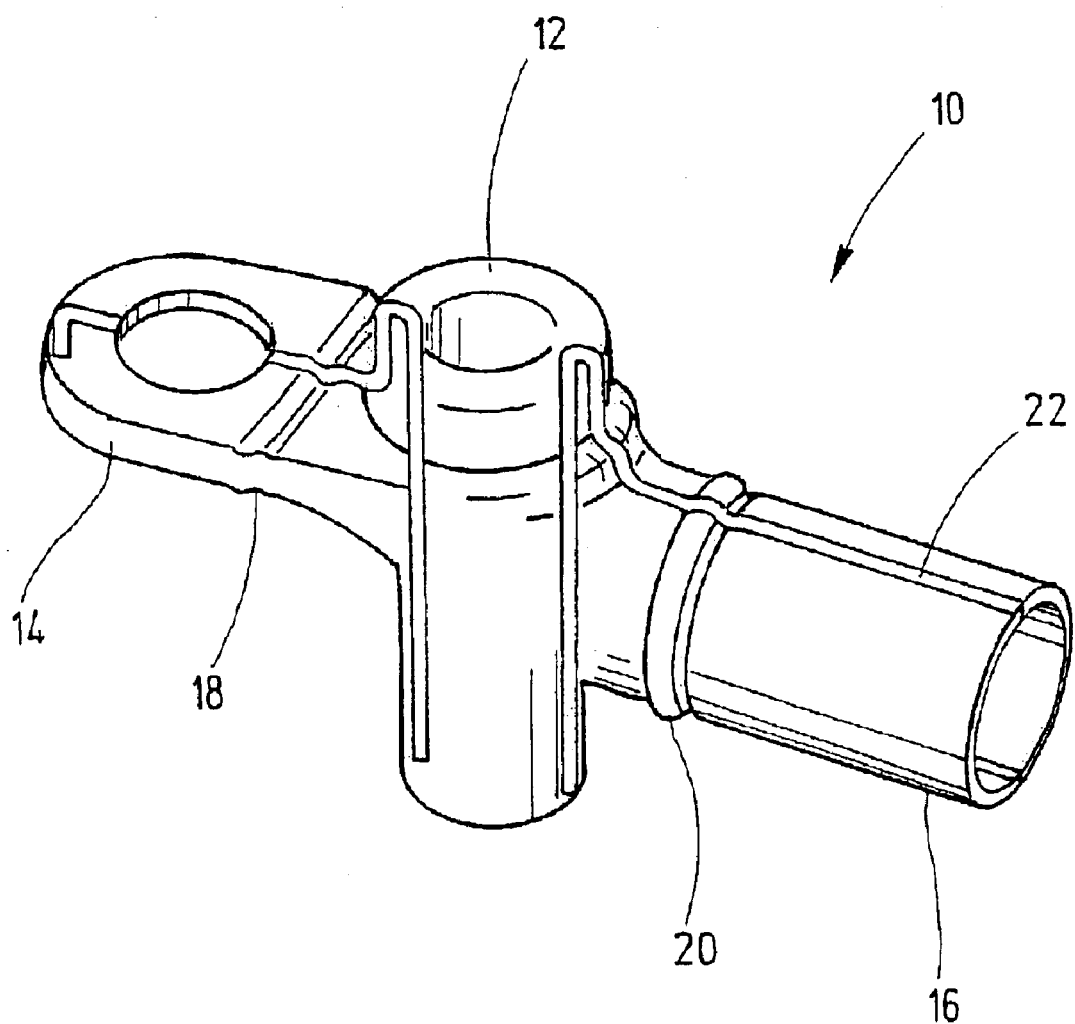
FIG. 3 shows a further perspective view of a wiper bearing housing according to the invention.

A perspective view of a wiper bearing housing 10 is also shown in FIG. 3. In addition, a line 22 representing an intersecting plane is shown.

Figure 4:
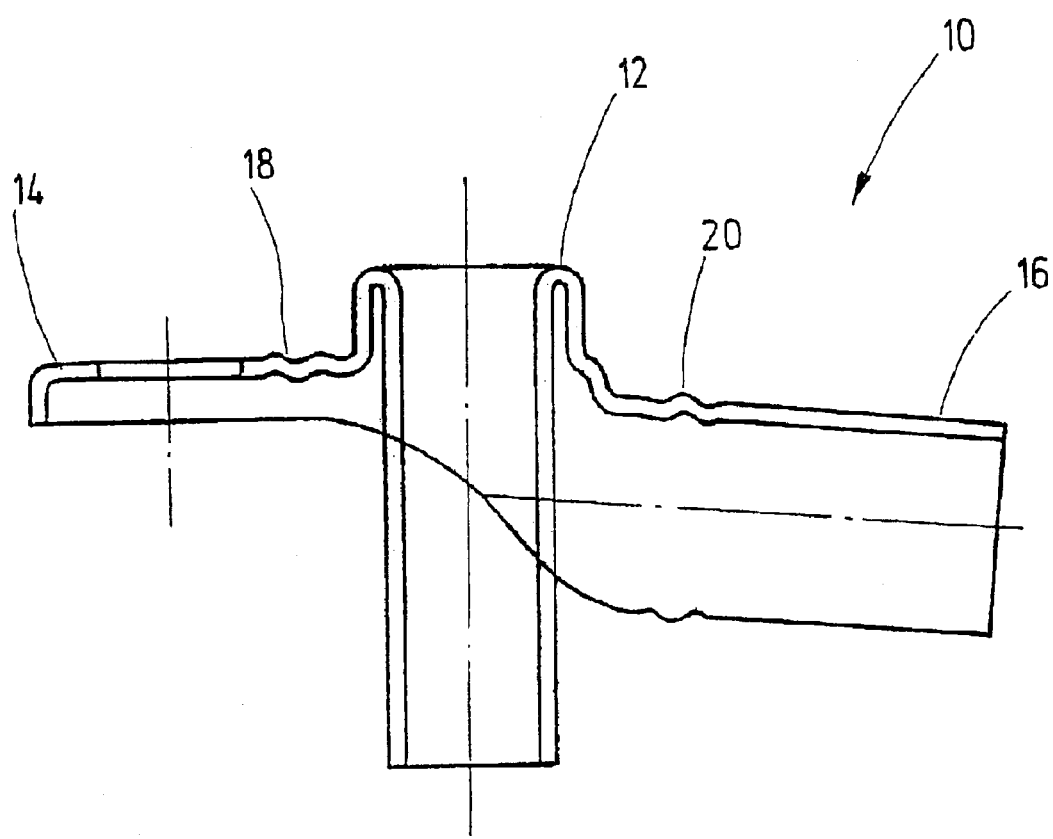
FIG. 4 shows a sectional view of a wiper bearing housing according to the invention in an initial state.

In FIG. 4, the wiper bearing housing according to FIG. 3 is shown in a sectional view along the line indicated with numeral 22 in FIG. 3. FIG. 4 shows the basic geometry of the wiper bearing housing 10 and, therefore, a non-deformed state. It is apparent that the wiper bearing housing is designed as a single component, whereby the sheet-metal bending technique was preferably used.

Figure 5:
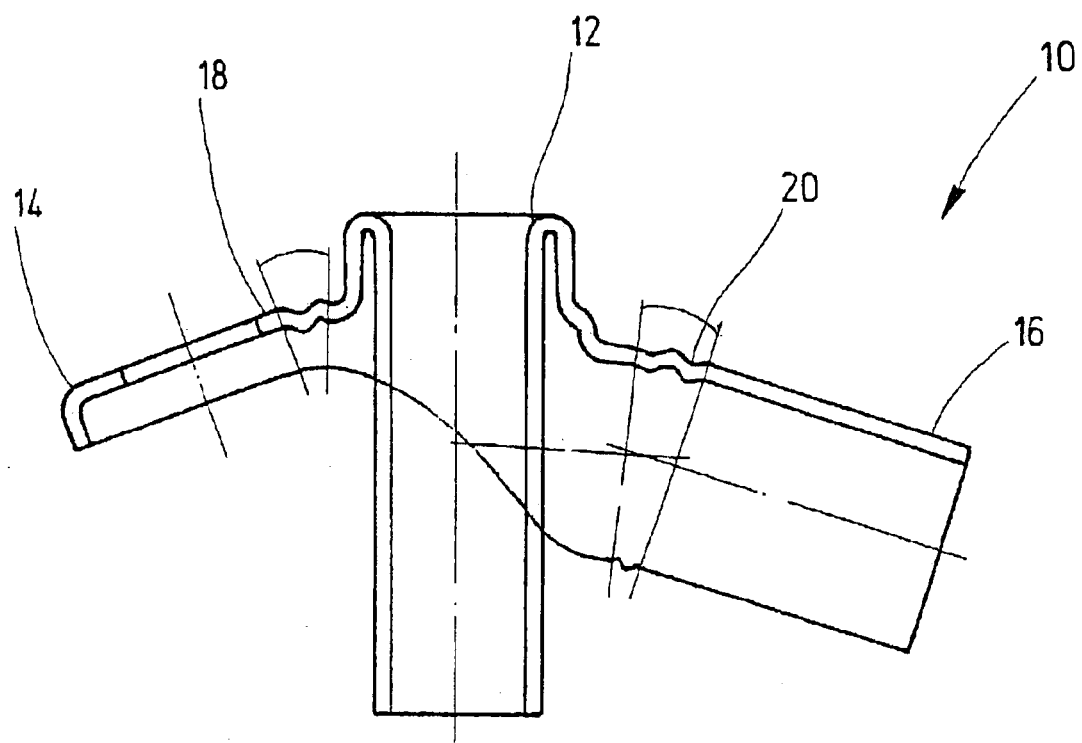
FIG. 5 shows a sectional view of a wiper bearing housing according to the invention in a second state.

The wiper bearing housing according to FIG. 3 is shown in a sectional view in FIG. 5, which said sectional view corresponds to that shown in FIG. 4, although a deformed state is shown here. The angles of deformation in the deformable regions 18, 20 are indicated.

Figure 6:
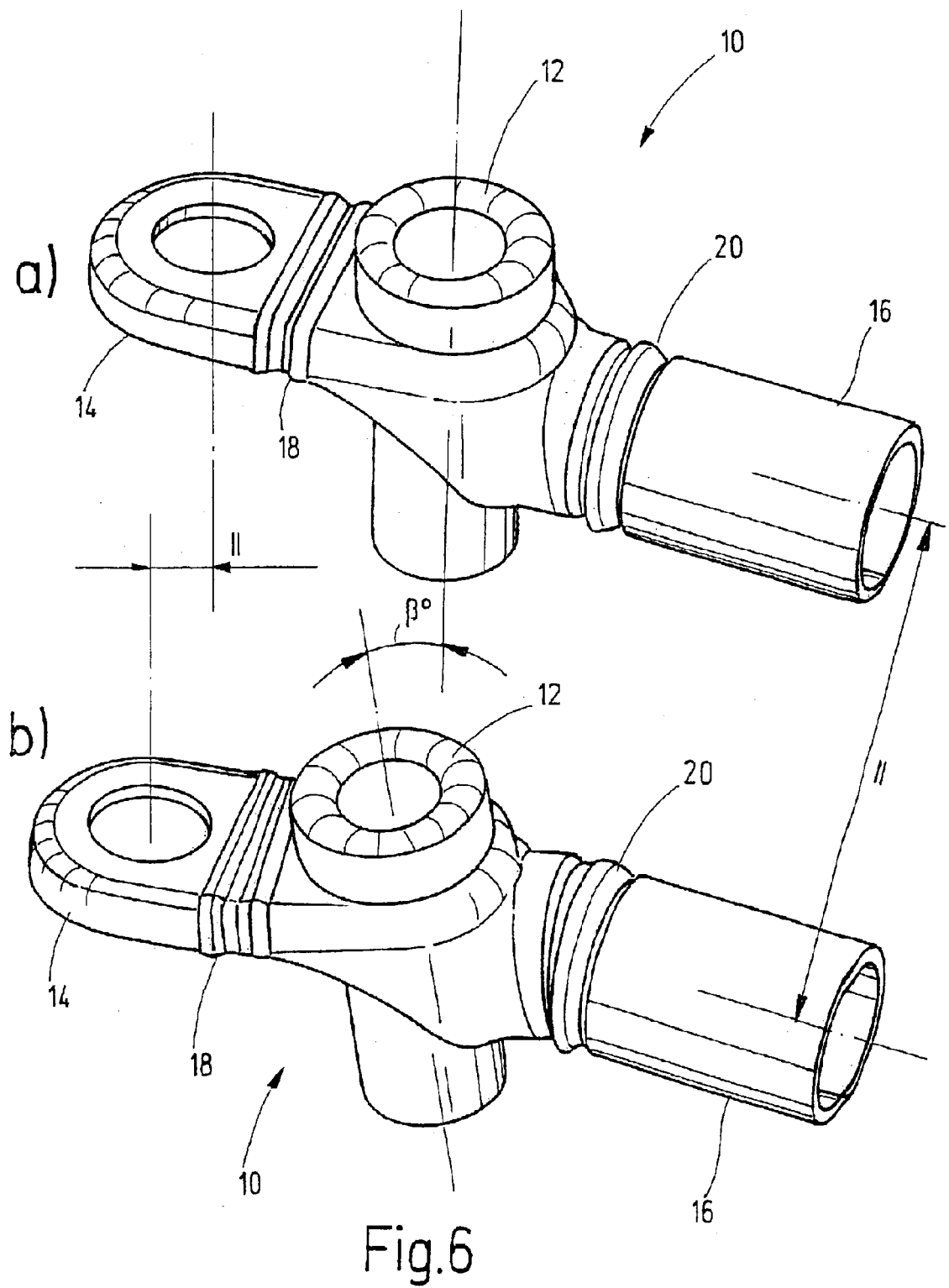
FIG. 6 shows two perspective views of wiper bearing housings according to the invention in different states of deformation.

FIG. 6 shows two wiper bearing housings 10. The wiper bearing housing according to FIG. 6a and the wiper bearing housing according to FIG. 6b have parallel axes with regard for the orientation of the fixing eye 14 and with regard for the orientation of the mounting tube 16. On account of the deformable regions it is possible, however, that the axes of the bearing region form an angle β with each other, so that the wiper axis can be oriented in relation to the motor vehicle window to be cleaned.

Figure 7:
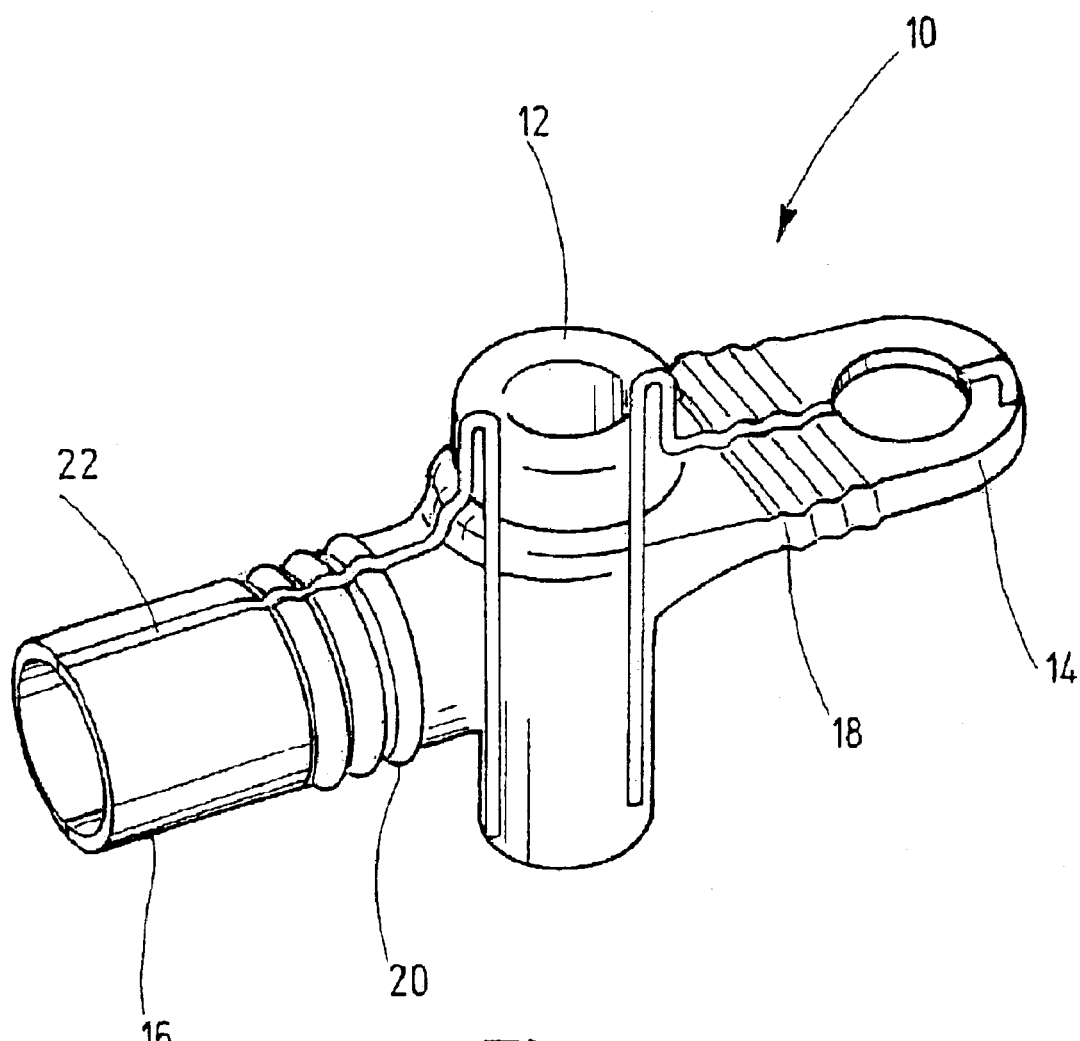
FIG. 7 shows a further perspective view of a wiper bearing housing according to the invention.

FIG. 7 shows a further exemplary embodiment of a wiper bearing 10 according to the invention. The special feature of this wiper bearing 10 lies in the fact that the deformable regions 18, 20 between the bearing region 12 and the fixing eye 14 or the tubular region 16 are extended in design. A greater deformability is therefore available, on the one hand, which can increase the range of application of the wiper bearing housing. On the other hand, the variant according to FIG. 7 offers greater impact protection in case of accidents. An intersection line 22 is shown in FIG. 7.

Figure 8:
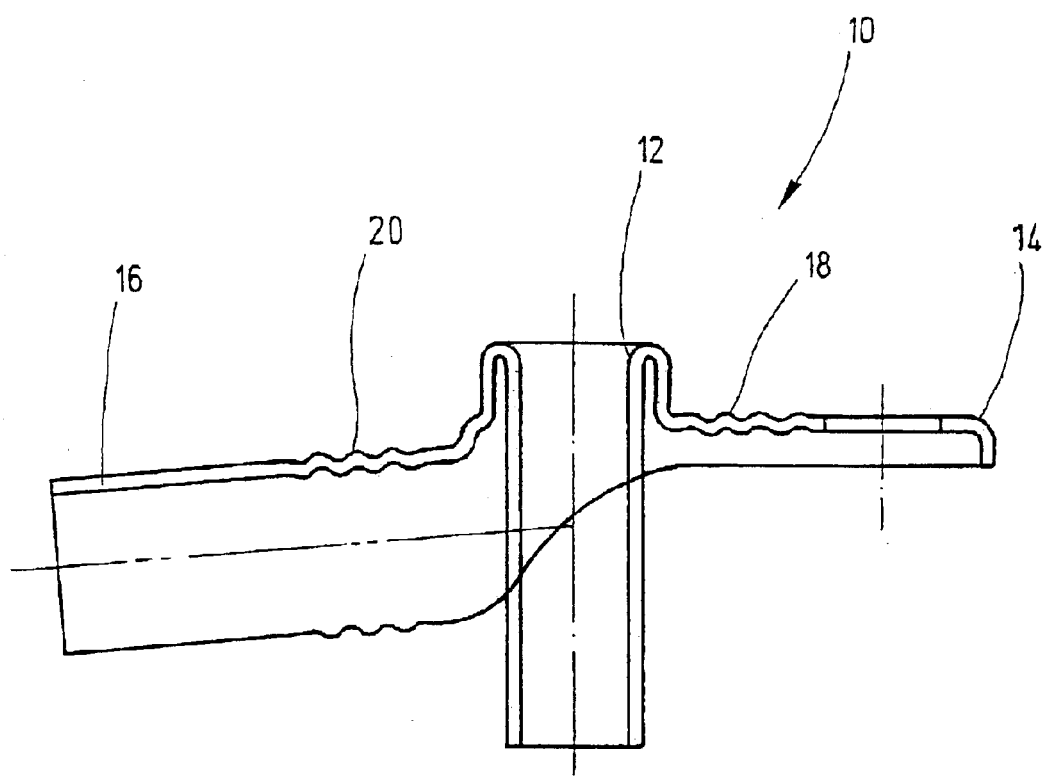
FIG. 8 shows a sectional view of a wiper bearing housing according to the invention in a non-deformed state.

FIG. 8 shows an illustration of a wiper bearing housing 10 according to FIG. 7 along the intersection line 22 in FIG. 7. The basic geometry of the wiper bearing housing 10 is shown.

Figure 9:
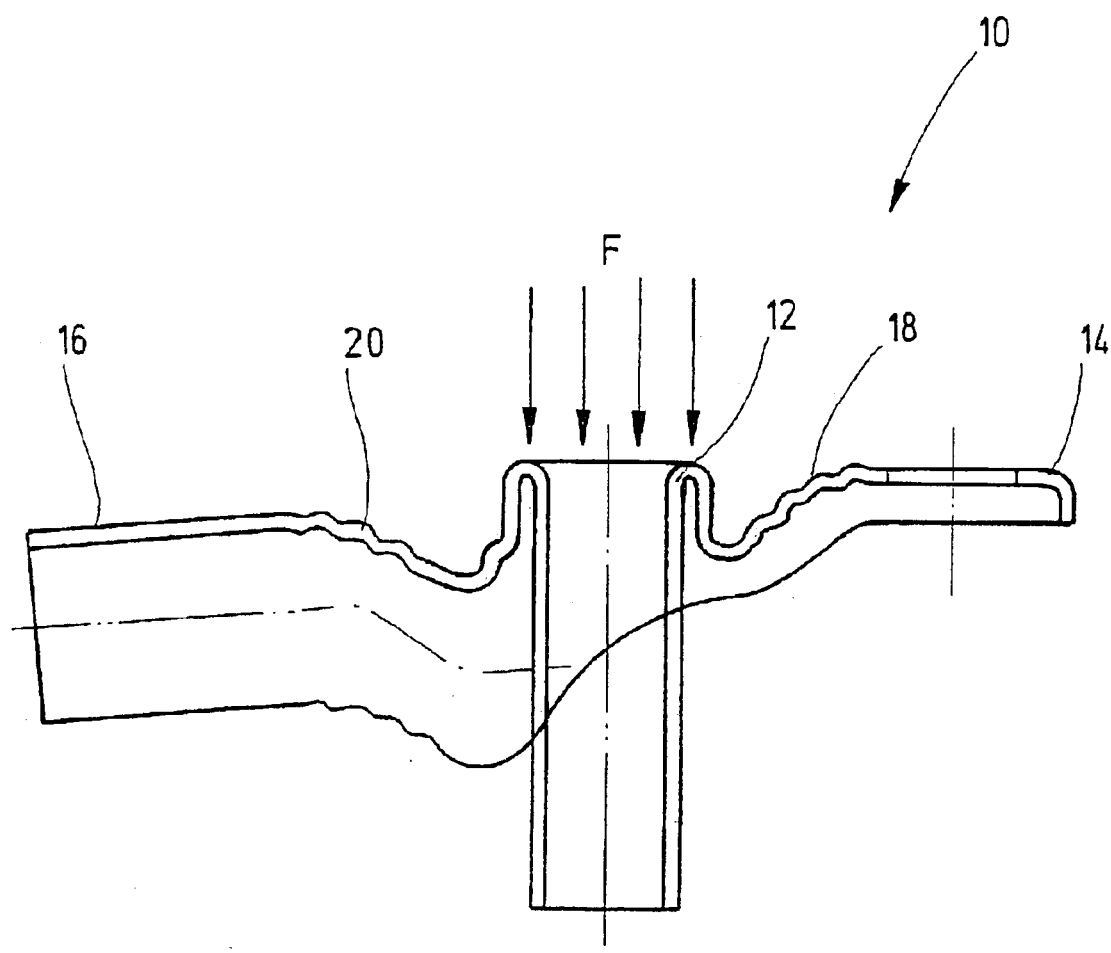
FIG. 9 shows a further sectional view of a wiper bearing housing according to the invention in a deformed state.

FIG. 9 shows the wiper bearing housing according to FIG. 7 in a deformed state, whereby the perspective corresponds to that shown in FIG. 8. A state is shown in which a force F acts on the bearing region 16 in the axial direction, which can be the case, for example, if a pedestrian is thrown onto the vehicle. It is apparent that the deformable regions 18, 20 have deformed in such a fashion that the bearing region 12 can retract downwardly. This dampens the impact of a pedestrian. The deformability or the strainability of the transitional regions 18, 20 can be designed to be plastic or elastic.

The preceding description of the exemplary embodiments according to the present invention is intended for illustrative purpose only and is not intended to limit the invention. Various changes and modifications are possible within the framework of the invention without leaving the scope of the invention or its equivalents.

What is claimed is:

1. A wiper bearing housing having a bearing region (12) and at least one mounting element (14, 18), wherein at least one transitional region (18, 2) between the bearing region (12) and the mounting element (14, 16) is deformable, wherein a tubular region (16) is provided as the mounting element.

2. The wiper bearing housing according to claim 1, wherein a fixing eye (14) is provided as the mounting element.

3. The wiper bearing housing according to claim 1, wherein the deformability of the at least one transitional region (18, 20) is realized by means of a corrugated region.

4. The wiper bearing housing according to claim 1, wherein it is designed as a sheet-metal component to be bent.

5. The wiper bearing housing according to claim 1, wherein it is deformable or strainable under the influence of axial force F.

6. The wiper bearing housing according to claim 1, wherein a deformability or strainability is plastic.

7. The wiper bearing housing according to claim 1, wherein a deformability or strainability is elastic.

8. A method for producing a wiper bearing housing (10) having a bearing region (12) and at least one mounting element (14, 16), wherein at least one deformable transitional region (18, 20) is situated between the bearing region (12) and the mounting element (14, 16), wherein a region (16) is pushed onto a holding tube before the at least one transitional region (18, 20) is formed, whereby the tubular region (16) can rotate in an axial direction.

9. The method according to claim 8, wherein forming of the deformable transitional region (18, 20) takes place in a form tool.

10. The method according to claim 8, wherein forming of the deformable transitional region (18, 20) takes place outside of a tool.

11. The method according to claim 8, wherein a corrugated transitional region (18, 20) is shaped.

12. The method according to claim 8, wherein a sheet-metal panel is used as the starting workpiece.

* * * * *